(12) United States Patent
Akutsu et al.

(10) Patent No.: US 12,305,064 B2
(45) Date of Patent: May 20, 2025

(54) DECORATIVE SHEET AND METHOD FOR MANUFACTURING DECORATIVE SHEET

(71) Applicant: TOPPAN HOLDINGS INC., Tokyo (JP)

(72) Inventors: Erika Akutsu, Tokyo (JP); Yohei Nishikawa, Tokyo (JP); Kosuke Shimizu, Tokyo (JP)

(73) Assignee: TOPPAN HOLDINGS INC., Tokyo (JP)

( * ) Notice: Subject to any disclaimer, the term of this patent is extended or adjusted under 35 U.S.C. 154(b) by 0 days.

(21) Appl. No.: 18/828,345

(22) Filed: Sep. 9, 2024

(65) Prior Publication Data
US 2024/0425717 A1 Dec. 26, 2024

Related U.S. Application Data

(63) Continuation of application No. PCT/JP2023/009407, filed on Mar. 10, 2023.

(51) Int. Cl.
*C09D 135/02* (2006.01)
*B05D 3/06* (2006.01)
(Continued)

(52) U.S. Cl.
CPC ........... *C09D 135/02* (2013.01); *B05D 3/065* (2013.01); *B05D 3/068* (2013.01); *B05D 5/02* (2013.01);
(Continued)

(58) Field of Classification Search
CPC .......... B05D 3/065; B05D 3/068; B05D 5/02; B05D 2502/005; C09D 4/00; C09D 5/28;
(Continued)

(56) References Cited

U.S. PATENT DOCUMENTS

| | | | | |
|---|---|---|---|---|
| 2007/0231583 A1* | 10/2007 | Ilzuka | ............... | B32B 27/10 |
| | | | | 428/411.1 |
| 2008/0070005 A1* | 3/2008 | Kobayashi | .......... | B32B 27/08 |
| | | | | 428/161 |

(Continued)

FOREIGN PATENT DOCUMENTS

| | | |
|---|---|---|
| JP | 2014-046617 A | 3/2014 |
| JP | 2014-047300 A | 3/2014 |

(Continued)

OTHER PUBLICATIONS

International Searching Authority, "International Search Report," issued in connection with International Patent Application No. PCT/JP2023/009407, dated May 23, 2023.
(Continued)

*Primary Examiner* — Jasper Saberi
(74) *Attorney, Agent, or Firm* — Foley & Lardner LLP (57) ABSTRACT

A decorative sheet includes: a primary film layer; and a surface protective layer, wherein the surface protective layer has a gloss level of 15 or less, the surface protective layer includes a ridged portion projecting in a ridged pattern from a surface of the surface protective layer to form an uneven shape on the surface, the surface protective layer contains an ionizing radiation-curable resin as a main material, the ionizing radiation-curable resin contains, as a main component, a tetrafunctional acrylic resin having a repeating structure, the number of repetitions of the repeating structure is 12 or more, a content of vinyl groups contained in the ionizing radiation-curable resin is 20% or less relative to carbonyl groups contained in the ionizing radiation-curable resin, and the uneven shape of the surface protective layer (5) has RSm/Ra in a range of 10 or greater and 300 or less.

18 Claims, 4 Drawing Sheets

(51) Int. Cl.
  *B05D 5/02* (2006.01)
  *B32B 3/30* (2006.01)
  *B32B 27/16* (2006.01)
  *B32B 27/30* (2006.01)
  *B44C 5/04* (2006.01)
  *C08F 22/10* (2006.01)
  *C08F 22/20* (2006.01)
  *C09D 4/00* (2006.01)
  *C09D 5/28* (2006.01)
  *C09D 7/40* (2018.01)

(52) U.S. Cl.
  CPC ............ *B32B 3/30* (2013.01); *B32B 27/16* (2013.01); *B32B 27/308* (2013.01); *B44C 5/0476* (2013.01); *C08F 22/1006* (2020.02); *C08F 22/20* (2013.01); *C09D 4/00* (2013.01); *C09D 5/28* (2013.01); *C09D 7/69* (2018.01); *B05D 2502/005* (2013.01); *B32B 2307/408* (2013.01); *B32B 2307/538* (2013.01)

(58) Field of Classification Search
  CPC ......... B32B 3/30; B32B 27/16; B32B 27/308; B32B 2307/538; B32B 2307/408; B44C 5/0476
  See application file for complete search history.

(56) References Cited

U.S. PATENT DOCUMENTS

| | | | | |
|---|---|---|---|---|
| 2011/0143128 A1* | 6/2011 | Saitou | ............ | B29C 45/14811 428/335 |
| 2011/0171429 A1* | 7/2011 | Huang | .................... | B44C 1/172 428/161 |
| 2014/0255669 A1* | 9/2014 | Akou | .................... | B32B 27/365 428/203 |
| 2018/0043669 A1* | 2/2018 | Iriyama | .................... | B32B 27/20 |
| 2018/0043718 A1* | 2/2018 | Masubuchi | ............ | C08G 18/42 |
| 2018/0257328 A1* | 9/2018 | Shinbara | ............... | E04F 15/107 |
| 2019/0184688 A1* | 6/2019 | Shinbara | .................. | C08J 7/046 |
| 2020/0061885 A1* | 2/2020 | Fujii | ....................... | B29C 45/14 |
| 2020/0299449 A1* | 9/2020 | Siband | ............... | C08G 18/6258 |
| 2023/0323144 A1* | 10/2023 | Kondo | .................... | B44F 1/02 428/141 |
| 2023/0364640 A1* | 11/2023 | Nishine | .................... | B44F 1/02 |

FOREIGN PATENT DOCUMENTS

| | | | | |
|---|---|---|---|---|
| JP | 2019-119138 A | | 7/2019 | |
| JP | 2022-025616 A | | 2/2022 | |
| JP | 2022-025624 A | | 2/2022 | |
| WO | WO-2022054645 A1 * | | 3/2022 | ............... B05D 5/02 |

OTHER PUBLICATIONS

International Searching Authority, "Written Opinion," issued in connection with International Patent Application No. PCT/JP2023/009407, dated May 23, 2023.

* cited by examiner

DECORATIVE SHEET AND METHOD FOR MANUFACTURING DECORATIVE SHEET

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2023/009407, filed on Mar. 10, 2023, which is based upon and claims the benefit to Japanese Patent Application No. 2022-038224, filed on Mar. 11, 2022, the disclosures of all which are incorporated herein by reference in their entirety.

BACKGROUND

Technical Field

The present invention relates to decorative sheets used for surface decoration of interiors and exteriors of buildings, fittings, furniture, construction materials, floor materials, and the like, and methods for producing the decorative sheets.

Background Art

Decorative sheets are commonly and widely used in the aforementioned buildings as decorative boards, in which the decorative sheets are laminated to the surface of wood, wooden boards, metal plates, fireproof boards, paper substrates, resin substrates or other materials via an adhesive or the like in order to provide surface design properties and durability.

To provide design properties, designs are selected depending on requirements and applications, ranging from wood-grain or stone-grain patterns formed by various printing methods to plain surfaces without a pattern. Further, surface gloss is also an important aspect of design properties, and glosses are selected depending on requirements and applications, ranging from a high, mirror-like gloss to low gloss causing no reflection.

As described above, along with design properties, durability is an important feature of decorative sheets. Durability is determined by an overall evaluation of scratch resistance, stain resistance, and whether they are maintained over a long period of time, and although requirements vary depending on the environment and conditions in which decorative sheets are used, highly durable decorative sheets are always in demand.

Durability is typically imparted by forming a surface protective layer on the outermost surface of the decorative sheets. In order to adjust the above-mentioned gloss, in particular, to achieve low gloss, a matting agent (matting additive) is typically added to the surface protective layer.

In addition, the decorative sheets are typically subjected to processing such as cutting and bending to form decorative boards or decorative materials, and preferably have processability to withstand these processes.

PTL 1 discloses an example of the decorative sheets obtained in consideration of design properties (low gloss), scratch resistance and stain resistance.

CITATION LIST

PTL 1: JP 2019-119138 A.

SUMMARY OF THE INVENTION

Technical Problems

In recent years, due to expansion of applications for decorative boards using decorative sheets and increasing quality orientation of consumers, decorative sheets are required to have a gloss level of 15 or less and achieve fingerprint resistance, scratch resistance, stain resistance and bending processability.

In response to the above requirements, gloss adjustment may be achieved by adding a matting agent to roughen the surface, but adding a large amount of matting agent causes the following disadvantages. (1) Fingerprint stains are not easily removed, resulting in lower fingerprint resistance. (2) The matting agent becomes detached during a scratch resistance test, resulting in lower scratch resistance. (3) Stains are not easily removed, resulting in lower stain resistance. (4) Whitening occurs due to the matting agent during bending, resulting in lower bending processability. Further, if the cross-linking density of the resin used in the surface protective layer is increased to improve scratch resistance, (5) the sheet curls significantly due to curing shrinkage, making it difficult to laminate it onto substrate materials.

The present invention has been made to provide a decorative sheet having high design properties with low gloss as well as fingerprint resistance, high durability (in particular, scratch resistance and stain resistance) and processability (lamination onto substrate materials and bending processability), and a method for producing the decorative sheet.

Solution to Problems

As a result of repeated experiments to optimize uneven shape of the surface protective layer and search for structural elements required for materials used in the surface protective layer, the inventors of the present invention have found that they could provide a decorative sheet having a gloss level of 15 or less and exhibiting fingerprint resistance, high durability (in particular, scratch resistance and stain resistance) and processability (lamination onto substrate materials and bending processability).

In order to solve the problem, a decorative sheet according to an aspect of the present invention includes: a primary film layer; and a surface protective layer disposed on one surface of the primary film layer, wherein the surface protective layer has a gloss level of 15 or less, the surface protective layer includes a ridged portion projecting in a ridged pattern from a surface of the surface protective layer to form an uneven shape on the surface, the surface protective layer contains an ionizing radiation-curable resin as a main material, the ionizing radiation-curable resin contains, as a main component, a tetrafunctional acrylic resin having a repeating structure, the number of repetitions of the repeating structure is 12 or more, a content of vinyl groups contained in the ionizing radiation-curable resin is 20% or less relative to carbonyl groups contained in the ionizing radiation-curable resin, and the uneven shape of the surface protective layer has RSm/Ra in a range of 10 or greater and 300 or less.

Advantageous Effects of Invention

According to an aspect of the present invention, a decorative sheet having a gloss level of 15 or less and achieving fingerprint resistance, scratch resistance, stain resistance and processability can be provided.

DETAILED DESCRIPTION

With reference to the drawings, a configuration of a decorative sheet according to an embodiment of the present invention will be described.

The drawings are schematic, and the relationship between the thickness and planar dimensions, the thickness ratio between each layer, and the like differ from actual values. In addition, the embodiments described below are examples of the configuration for embodying the technical idea of the present invention, and the technical idea of the present invention can be modified in various manners within the technical scope defined in the claims.

(Configuration)

Figure 1:
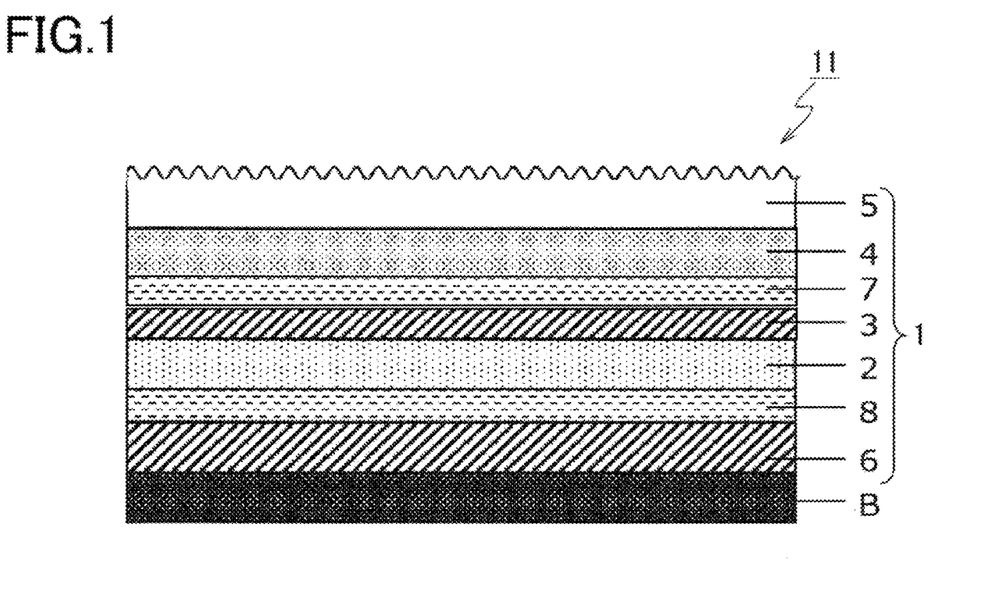
FIG. 1 is a schematic cross-sectional view illustrating a configuration of a decorative sheet according to an embodiment of the present invention.

As shown in FIG. 1, a decorative sheet 1 according to the present embodiment includes a pattern layer 3, an adhesive layer 7 (heat-sensitive adhesive layer, anchor coat layer or dry lamination adhesive layer), a transparent resin layer 4 and a surface protective layer 5, which are laminated in this order on one side of a primary film layer (base layer) 2, which is a front surface-side. The decorative sheet 1 further includes a concealing layer 8 and a primer layer 6 on the other side of the primary film layer 2, which is a rear surface-side. The pattern layer 3, the adhesive layer 7, the transparent resin layer 4, the concealing layer 8 and the primer layer 6 may be omitted.

Further, as shown in FIG. 1, the decorative sheet 1 according to the present embodiment is bonded to a substrate B to form a decorative material 11. The substrate B is not particularly limited, and may be formed of, for example, a wooden board, an inorganic board, a metal plate or a composite plate made from a plurality of materials.

<Primary Film Layer 2>

The primary film layer 2 may be made of any material selected from, for example, paper, synthetic resins, synthetic resin foams, rubbers, nonwoven fabrics, synthetic paper and metal foils. Examples of the paper include tissue paper, titanium paper and resin-impregnated paper. Examples of the synthetic resins include polyethylene, polypropylene, polybutylene, polystyrene, polycarbonate, polyester, polyamide, ethylene-vinyl acetate copolymers, polyvinyl alcohol, and acrylic resins. Examples of the rubbers include ethylene-propylene copolymer rubbers, ethylene-propylene-diene copolymer rubbers, styrene-butadiene copolymer rubbers, styrene-isoprene-styrene block copolymer rubbers, styrene-butadiene-styrene block copolymer rubbers and polyurethane. Examples of the nonwoven fabrics include organic and inorganic nonwoven fabrics. Examples of metals of the metal foils include aluminum, iron, gold and silver.

When an olefin-based resin is used as the primary film layer 2, the primer layer 6 is preferably disposed between the primary film layer 2 and the substrate B since a surface of the primary film layer 2 is often inert. In addition, the primary film layer 2 may be subjected to a surface modification treatment, such as corona treatment, plasma treatment, ozone treatment, electron beam treatment, ultraviolet treatment or dichromate treatment, in order to improve adhesion between the primary film layer 2 made of an olefin-based material and the substrate B.

The primer layer 6 may be made of the same material as that of the pattern layer 3, which will be described later. Considering that the decorative sheet 1 is wound into a roll, the primer layer 6, which is disposed on the rear surface of the decorative sheet 1, may contain an inorganic filler in order to prevent blocking and enhance adhesion to the adhesive. Examples of the inorganic filler include silica, alumina, magnesia, titanium oxide and barium sulfate.

In consideration of printing workability and costs, the thickness of the primary film layer 2 is preferably in the range of 20 μm or greater and 250 μm or less.

<Pattern Layer 3>

The pattern layer 3 is a layer obtained by printing a pattern on the primary film layer 2 with ink. A binder for ink can be appropriately selected from, for example, nitrocellulose, cellulose, vinyl chloride-vinyl acetate copolymers, polyvinyl butyral, polyurethane, acrylic, polyester and modified products thereof. The binder may be any aqueous, solvent or emulsion type, and may be a one-part type or a two-part type which uses a curing agent. Further, curable inks may be used and cured by irradiation with ultraviolet light, electron beams, or the like. Among others, the most typical method is the use of urethane-based inks that are cured using isocyanate. In addition to the binder, colorants such as pigments and dyes, extender pigments, solvents and various additives used in general inks may be added to the pattern layer 3. Examples of highly versatile pigments include condensed azo pigments, insoluble azo pigments, quinacridones, isoindolines, anthraquinones, imidazolones, cobalt, phthalocyanines, carbon, titanium oxide, iron oxide and pearl pigments such as mica.

Besides the application of inks, vapor deposition or sputtering of various metals can be performed to apply a design to the pattern layer 3. In particular, it is preferred that a photostabilizer is added to the above inks in order to suppress deterioration of the decorative sheet 1 itself due to photodegradation of ink and extend the life of the decorative sheet 1.

<Adhesive Layer 7>

The adhesive layer 7 is a layer also called a heat-sensitive adhesive layer, an anchor coat layer or a dry lamination adhesive layer.

The resin materials used for the adhesive layer 7 are not particularly limited, and can be appropriately selected from, for example, acrylic, polyester-based, polyurethane-based and epoxy-based resin materials. Examples of the resin materials of the adhesive layer 7 can further include ethylene-vinyl acetate copolymer resin-based adhesives. A method of applying the adhesive layer 7 can be appropriately selected depending on the viscosity of the adhesive, and the like, and gravure coating is typically used. After being applied to the upper surface of the pattern layer 3 by gravure coating, the adhesive layer 7 is laminated to the transparent resin layer 4. The adhesive layer 7 may be omitted when the adhesion strength between the transparent resin layer 4 and the pattern layer 3 is sufficient.

<Transparent Resin Layer 4>

A resin material of the transparent resin layer 4 is preferably an olefin-based resin. Examples of the olefin-based resin include polypropylene, polyethylene and polybutene, as well as homopolymers of α-olefins and copolymers of two or more α-olefins (e.g., propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, 3-methyl-1-butene, 3-methyl-1-pentene, 3-ethyl-1-pentene, 4-methyl-1-pentene, 4-methyl-1-hexene, 4,4-dimethyl-1-pentene, 4-ethyl-1-hexene, 3-ethyl-1-hexene, 9-methyl-1-decene, 11-methyl-1-dodecene, and 12-ethyl-1-tetradecene), and copolymers of ethylene or an α-olefin with another monomer, such as ethylene-vinyl acetate copolymer, ethylene-vinyl alcohol copolymer, ethylene-methyl methacrylate copolymer, ethylene-ethyl methacrylate copolymer, ethylene-butyl methacrylate copolymer, ethylene-methyl acrylate copolymer, ethylene-ethyl acrylate copolymer and ethylene-butyl acrylate copolymer.

In order to improve surface strength of the decorative sheet 1, highly crystalline polypropylene is preferably used as the resin of the transparent resin layer 4. In necessary, the transparent resin layer 4 may contain various additives such as thermal stabilizer, photostabilizer, anti-blocking agent, catalyst scavenger, colorant, light scattering agent and matting agent. The thermal stabilizer is typically added in any combination between phenol-based, sulfur-based, phosphorus-based and hydrazine-based thermal stabilizers, and the photostabilizer is typically added in any combination between hindered amine-based photostabilizers.

<Surface Protective Layer 5>

The surface protective layer 5 includes a core portion 5A and a ridged portion 5B projecting in a ridged pattern from one surface of the core portion 5A. Accordingly, an uneven shape is formed on the surface of the surface protective layer 5.

In the decorative sheet 1 according to the present embodiment, the "ridged pattern" refers to a pattern of narrow and long projections that linearly continue in plan view. The ridged portion 5B may be curved or linear in plan view, but is preferably curved from the viewpoint of fingerprint resistance on the surface of the decorative sheet 1. In the present disclosure, the ridged portion 5B may refer to, for example, a portion from the bottom to the top of the uneven shape formed on the surface of the surface protective layer 5, and the core portion 5A refers to a portion of the surface protective layer 5 excluding the ridged portion 5B.

Figure 2:
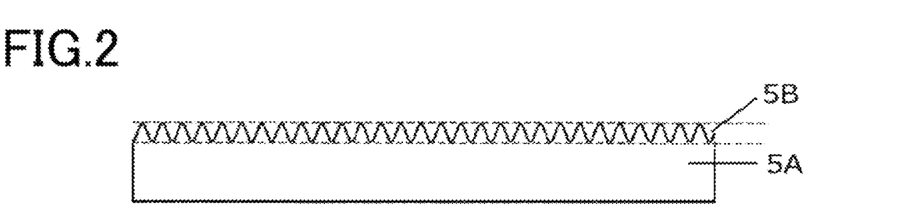
FIG. 2 is a schematic cross-sectional view illustrating a configuration of a surface protective layer in the decorative sheet according to an embodiment of the present invention.
Figure 3:
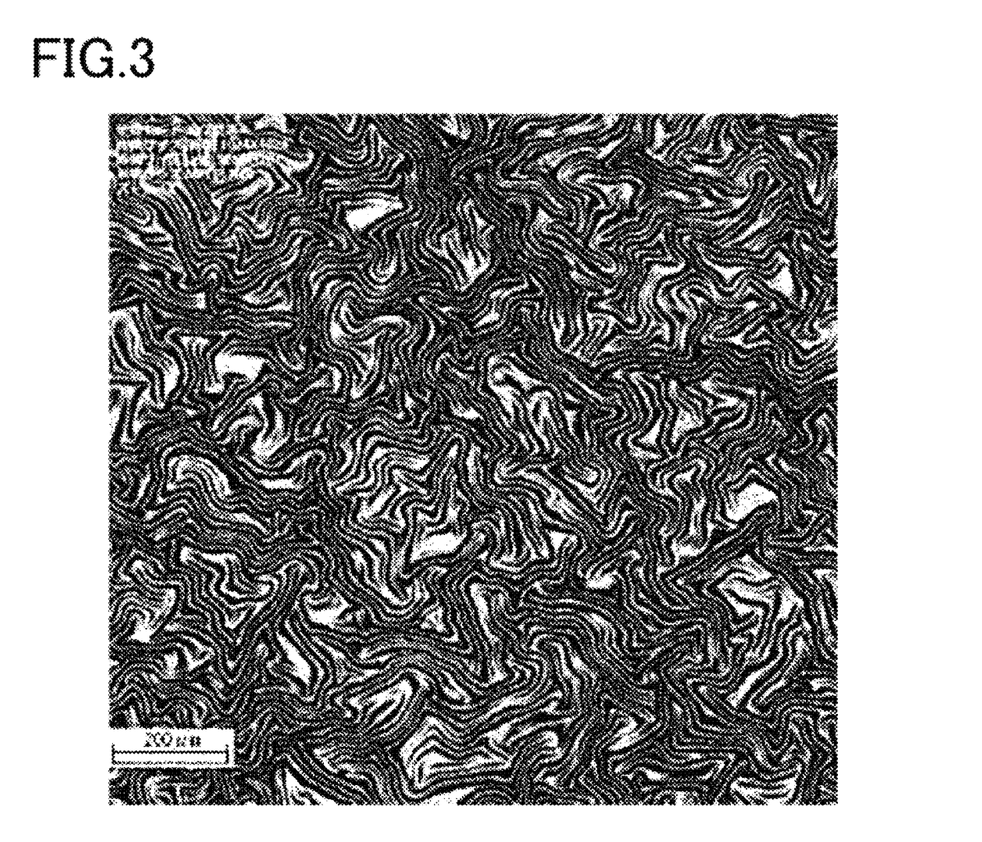
FIG. 3 is a two-dimensional image showing an example configuration of a surface of the surface protective layer in the decorative sheet according to an embodiment of the present invention.

FIG. 2 is a cross-sectional view schematically illustrating a cross-section (a cross-section in the thickness direction of the surface protective layer 5) of the ridged portion 5B in the surface protective layer 5, and FIG. 3 is a two-dimensional image showing a configuration of the surface of the surface protective layer 5. FIG. 3 is a two-dimensional image obtained using a laser microscope (OLS-4000 manufactured by Olympus Corporation).

As shown in the two-dimensional image of FIG. 3, the ridged portion 5B is in the shape of narrow and long projections that linearly continue in plan view. As described later, the ridged portion 5B is formed by irradiating the surface of an ionizing radiation-curable resin with light having a certain wavelength to shrink the surface of the ionizing radiation-curable resin.

The shape of the ridged portion 5B can be expressed by a ratio RSm/Ra of the surface roughness index RSm (m) in the lateral direction (the planar direction of the surface protective layer 5, or the horizontal direction in FIG. 2) to the surface roughness index Ra (m) in the vertical direction (the depth direction of the ridged portion 5B, the thickness direction of the surface protective layer 5, or the vertical direction in FIG. 2), and RSm/Ra is 10 or greater and 300 or less. More preferably, RSm/Ra is 50 or greater and 300 or less. When RSm/Ra is less than 10, the shape of the ridged portion 5B is so fine that stains cannot easily be wiped off, resulting in lower stain resistance. When RSm/Ra is greater than 300, gaps between the ridges are so wide that low gloss cannot be achieved.

Still more preferably, RSm/Ra is 100 or greater and 300 or less. When RSm/Ra is within this numerical range, the gaps between the ridges have an appropriate width, improving the affinity to water or detergent (water containing a surfactant or an alcohol). Therefore, in the decorative sheet having RSm/Ra within this numerical range, stains can be easily wiped off with water or a detergent even if the surface of the decorative sheet is stained.

Most preferably, RSm/Ra is 100 or greater and 250 or less. When RSm/Ra is within this numerical range, commonly commercially available washing sponges easily penetrate between the ridges, and stains can be easily wiped off using a commonly commercially available washing sponge even if the surface of the decorative sheet is stained.

Further, RSm (m) may be 50 or greater and 400 or less, and preferably 80 or greater and 300 or less. When RSm (m) is within this numerical range, the gaps between the ridges have an appropriate width, improving the affinity to water or detergent (water containing a surfactant or an alcohol). Therefore, in the decorative sheet having RSm (m) within this numerical range, stains can be easily wiped off with water or a detergent even if the surface of the decorative sheet is stained.

Further, Ra (m) may be 0.5 or greater and 10 or less, and preferably 0.8 or greater and 5 or less. When Ra (m) is within this numerical range, commonly commercially available washing sponges easily penetrate between the ridges, and stains can be easily wiped off using a commonly commercially available washing sponge even if the surface of the decorative sheet is stained.

Ra and RSm are measurements determined with a stylus roughness tester (according to JIS B 0601).

The ridged portion 5B may have a sinusoidal cross-sectional shape in the thickness direction of the surface protective layer 5.

Figure 4:
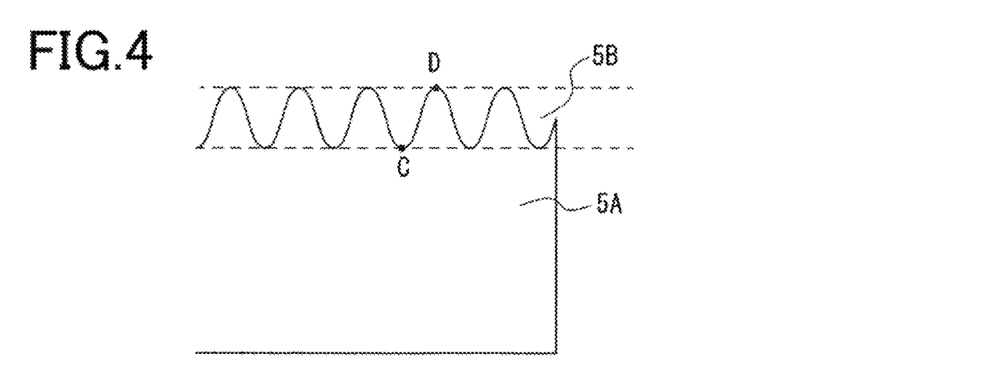
FIG. 4 is a schematic cross-sectional view illustrating a cross-sectional shape of a ridged portion in an embodiment of the present invention.

The "sinusoidal shape" refers to a shape in which the line from a lowest position C to a highest position (peak) D of the ridged portion 5B can be represented by a sinusoidal wave as shown in FIG. 4.

In the following description, a mechanism of forming the ridged portion 5B will be described.

When irradiated with first irradiation light, i.e., light having a wavelength of 200 nm or less, an acrylate can be self-excited. Accordingly, irradiation of an acrylate with light at 200 nm or less enables the acrylate to be crosslinked. Light at 200 nm or less reaches a depth of around several tens to hundreds nanometers in the acrylate. Therefore, crosslinking occurs only on the surface while the underlying part has fluidity, thus producing fine wavy uneven shape like folding creases.

The surface protective layer 5 thus formed has no interface between the core portion 5A and the ridged portion 5B, and the core portion 5A and the ridged portion 5B are integrally and continuously formed.

Light at 200 nm or less is absorbed by oxygen in the air and greatly attenuated. Therefore, when acrylate is treated, the reaction atmosphere needs to be controlled by introducing nitrogen gas. The concentration of residual oxygen in the reaction atmosphere is preferably controlled to 2,000 ppm or less. More preferably, the concentration of residual oxygen in the reaction atmosphere is 1,000 ppm or less.

In order to produce an uneven shape using the first irradiation light, which is light having a wavelength of 200 nm or less, the first irradiation light preferably has an integrated light intensity of 0.5 mJ/cm$^2$ or greater and 200 mJ/cm$^2$ or less. More preferably, the integrated light intensity is 1 mJ/cm$^2$ or greater and 100 mJ/cm$^2$ or less. Still more preferably, the integrated light intensity is 3 mJ/cm$^2$ or greater and 50 mJ/cm$^2$ or less. Most preferably, the integrated light intensity is 5 mJ/cm$^2$ or greater and 30 mJ/cm$^2$ or less. When the integrated light intensity is less than 0.5 mJ/cm$^2$, the cure shrinkage reaction proceeds slowly and an uneven shape is not sufficiently formed, resulting in the gloss being not decreased. When the integrated light intensity is greater than 200 mJ/cm$^2$, the cure shrinkage reaction proceeds so rapidly that the surface condition deteriorates.

Light at 200 nm or less can be extracted from excimer VUV light. The excimer VUV light can be produced from a noble gas or noble gas halide compound lamp. When a lamp having a noble gas or a noble gas halide compound gas sealed therein is externally provided with high energy electrons, the lamp generates a large amount of discharge plasma (dielectric barrier discharge). This plasma discharge excites atoms of the discharge gas (noble gas) and instantaneously converts them into an excimer state. When the atoms return from the excimer state to the ground state, light having a wavelength in a range specific to that excimer is emitted.

The gas used for the excimer lamp may be any conventionally used gas as long as the gas emits light at 200 nm or less. Examples of the gas include noble gases such as Xe, Ar and Kr, and mixed gases of noble gas and halogen gas, such as ArBr and ArF. Light from the excimer lamp has different wavelengths (center wavelengths) for different gases, such as about 172 nm (Xe), about 126 nm (Ar), about 146 nm (Kr), about 165 nm (ArBr) and about 193 nm (ArF).

However, in consideration of the magnitude of the resulting photon energy and the difference between the wavelength and the binding energy of organic matter, it is preferred to use a xenon lamp that emits excimer light with a center wavelength of 172 nm as a light source. Also in consideration of the cost of maintaining the equipment, the availability of materials, and the like, it is preferred to use a xenon lamp as a light source.

Since the first irradiation light, which is the light with a wavelength of 200 nm or less, only reaches a depth of around several tens to hundreds nanometers from the outermost surface in the acrylate, the inside of the surface protective layer 5 including the ridged portion 5B formed by irradiation with light at 200 nm or less has fluidity, which needs further curing reaction. In order to cure the surface protective layer 5 after the irradiation with light at 200 nm or less, ionizing radiation or UV light having a wavelength greater than the first irradiation light, i.e., greater than the light having a wavelength of 200 nm or less, can be used as second irradiation light.

In the present embodiment, for example, after the irradiation with the second irradiation light, irradiation may be performed with, as third irradiation light, ionizing radiation different from the second irradiation light or UV light having a wavelength greater than the wavelength of the second irradiation light. However, it is preferred that the surface protective layer 5 including the ridged portion 5B is formed only by irradiation with the two types of light, i.e., the first irradiation light and the second irradiation light. The third irradiation light may be applied when the strength of the surface protective layer 5 is not sufficient only with the irradiation with the second irradiation light.

In order to cure the entire surface protective layer 5 with the irradiation with the second irradiation light, the second irradiation light preferably has an integrated light intensity of 10 mJ/cm$^2$ or greater and 500 mJ/cm$^2$ or less. More preferably, the integrated light intensity is 50 mJ/cm$^2$ or greater and 400 mJ/cm$^2$ or less. Still more preferably, the integrated light intensity is 100 mJ/cm$^2$ or greater and 300 mJ/cm$^2$ or less. When the integrated light intensity is less than 10 mJ/cm$^2$, the curing reaction proceeds slowly, and the entire surface protective layer 5 cannot have sufficient strength, resulting in the tendency of lower scratch resistance. When the integrated light intensity is greater than 500 mJ/cm$^2$, the curing reaction proceeds so rapidly that the surface condition tends to deteriorate.

The integrated light intensity of the second irradiation light is preferably greater than the integrated light intensity of the first irradiation light. The integrated light intensity of the second irradiation light is preferably 1.1 times or more and 50.0 times or less the integrated light intensity of the first irradiation light, and more preferably 5.0 times or more and 30.0 times or less. When the integrated light intensity of the second irradiation light is less than 1.1 times the integrated light intensity of the first irradiation light, the curing reaction proceeds slowly, and the entire surface protective layer 5 may not have sufficient strength. When the integrated light intensity of the second irradiation light is greater than 50.0 times the integrated light intensity of the first irradiation light, the curing reaction in the entire surface protective layer 5 proceeds so rapidly that the shape of the ridged portion 5B may be deformed.

With reference to FIGS. 5A-5J, changes in irradiation intensity of the first irradiation light with time and changes in irradiation intensity of the second irradiation light with time will be described.

FIGS. 5A-5J are diagrams schematically illustrating changes in irradiation intensity of the first irradiation light with time and changes in irradiation intensity of the second irradiation light with time.

FIGS. 5A, 5C, 5E, 5G and 5I are diagrams schematically illustrating changes in irradiation intensity of the first irradiation light with time. FIGS. 5B, 5D, 5F, 5H and 5J are diagrams schematically illustrating changes in irradiation intensity of the second irradiation light with time.

Figure 5A:
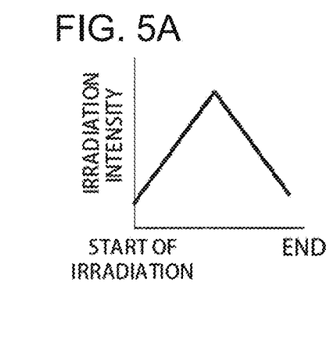
FIGS. 5A-5J are schematic diagrams illustrating changes in irradiation intensity of irradiation light with time during production of a decorative sheet according to an embodiment of the present invention.

As shown in FIG. 5A, the irradiation intensity of the first irradiation light may gradually increase with the lapse of irradiation time and then gradually decrease with the lapse of irradiation time. As shown in FIG. 5C, the irradiation intensity of the first irradiation light may gradually decrease with the lapse of irradiation time. As shown in FIG. 5E, the irradiation intensity of the first irradiation light may gradually increase with the lapse of irradiation time. As shown in FIG. 5G, the irradiation intensity of the first irradiation light may gradually decrease with the lapse of irradiation time and then gradually increase with the lapse of irradiation time. As shown in FIG. 5I, the irradiation intensity of the first irradiation light may be constant from the start to the end of irradiation.

Figure 5B:
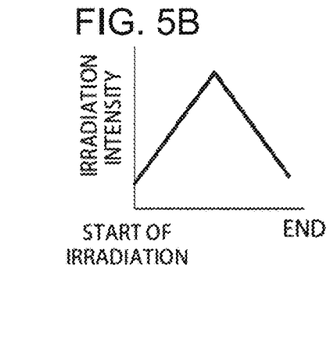
Figure 5C:
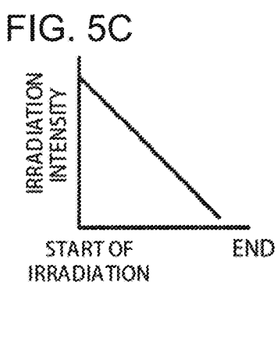
Figure 5D:
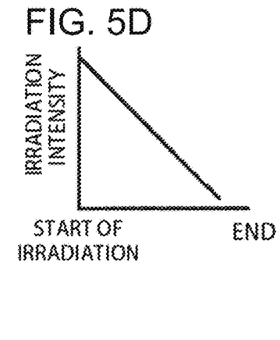
Figure 5E:
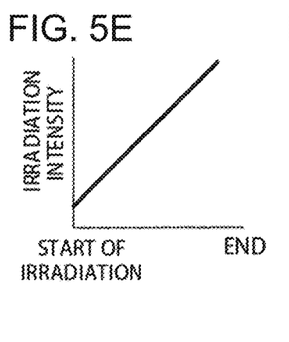
Figure 5F:
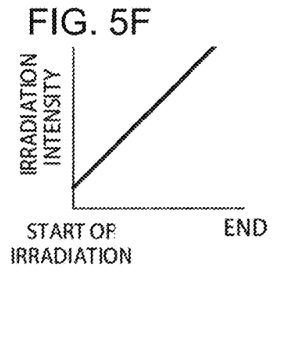
Figure 5G:
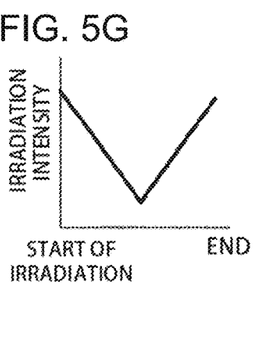
Figure 5H:
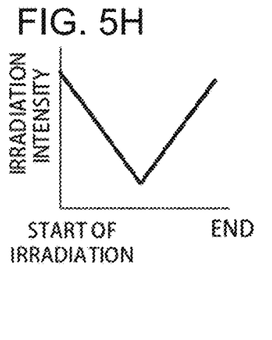
Figure 5I:
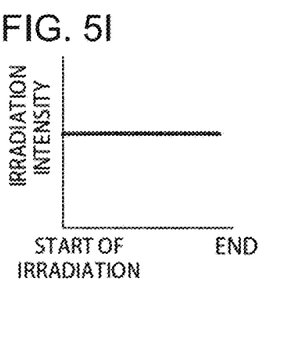
Figure 5J:
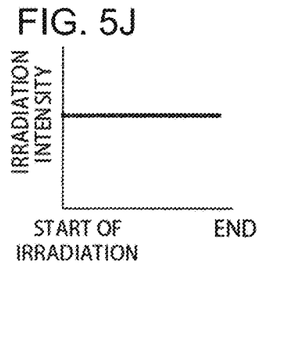

As shown in FIG. 5B, the irradiation intensity of the second irradiation light may gradually increase with the lapse of irradiation time and then gradually decrease with the lapse of irradiation time. As shown in FIG. 5D, the irradiation intensity of the second irradiation light may gradually decrease with the lapse of irradiation time. As shown in FIG. 5F, the irradiation intensity of the second irradiation light may gradually increase with the lapse of irradiation time. As shown in FIG. 5H, the irradiation intensity of the second irradiation light may gradually decrease with the lapse of irradiation time and then gradually increase with the lapse of irradiation time. As shown in FIG. 5J, the irradiation intensity of the second irradiation light may be constant from the start to the end of irradiation.

In the present embodiment, the forms of irradiation with the first irradiation light shown in FIGS. 5A, 5C, 5E, 5G and 5I can be appropriately combined with the forms of irradiation with the second irradiation light shown in FIGS. 5B, 5D, 5F, 5H and 5J. For example, the form of irradiation with the first irradiation light shown in FIG. 5A may be combined with the form of irradiation with the second irradiation light shown in FIG. 5F. Alternatively, the form of irradiation with the first irradiation light shown in FIG. 5G may be combined with the form of irradiation with the second irradiation light shown in FIG. 5F. When RSm/Ra is set to a value in the range of 10 or greater and 300 or less, the form of irradiation with the first irradiation light shown in FIG. 5C is preferably combined with the form of irradiation with the second irradiation light shown in FIG. 5F.

As described above, the ridged portion 5B formed by irradiation with light at 200 nm or less has a finer structure than the uneven shape formed by mechanical processing such as embossing on the surface of the surface protective layer 5. The fine uneven shape formed on the surface of the surface protective layer 5 can provide the decorative sheet 1 with improved fingerprint resistance while maintaining the matte appearance of the surface of the decorative sheet 1.

The surface protective layer 5 preferably has a thickness in the range of 2 µm or greater and 20 µm or less. More preferably, the thickness of the surface protective layer 5 is in the range of 3 µm or greater and 20 µm or less. Still more preferably, the thickness of the surface protective layer 5 is in the range of 5 µm or greater and 15 µm or less. Most preferably, the thickness of the surface protective layer 5 is in the range of 5 µm or greater and 12 µm or less. When the thickness of the surface protective layer 5 is less than 2 µm, the vacuum ultraviolet light cannot deeply shape the layer, resulting in a failure in achieving low gloss. When the thickness of the surface protective layer 5 is greater than 20 µm, processability decreases and whitening occurs during bending.

The thickness of the surface protective layer 5 may be set so that the ratio of the thickness of the ridged portion 5B to the thickness of the core portion 5A (thickness of ridged portion 5B/thickness of core portion 5A) is preferably 0.01 or greater and 2.0 or less, and more preferably 0.1 or greater and 1.0 or less.

The pattern layer 3 and the surface protective layer 5 can be formed by various printing methods such as gravure printing, offset printing, screen printing, electrostatic printing and inkjet printing. Further, since the surface protective layer 5 covers the entire surface on the front-surface side of the primary film layer 2, it can be formed by various coating methods such as roll coating, knife coating, micro gravure coating and die coating. These printing and coating methods may be selected separately for each layer to be formed, or the same method may be selected to process the layers collectively.

The pattern layer 3 and the surface protective layer 5 may be matched from the viewpoint of design properties. For matching, the surface protective layer 5 needs to be collectively formed after the formation of the pattern layer 3, and therefore gravure printing is preferably used. In addition, gravure printing is capable of relatively high-speed processing, and is preferred due to cost advantages. Matching means that 50% or more, preferably 70% or more, and most preferably 90% or more of the portion where the surface protective layer 5 is formed overlaps the pattern portion of the pattern layer 3 in plan view.

In order to adjust the thickness of the surface protective layer 5, the coating amount may be adjusted in the aforementioned printing and coating methods. The coating amount can be determined by preparing base layers (primary film layers) with a surface protective layer and without a surface protective layer in various printing and coating methods, and calculating the mass difference.

The surface protective layer 5 contains an ionizing radiation-curable resin as a main material. The main material herein refers to a material contained in an amount of 60 parts by mass or more, more preferably 70 parts by mass or more, and most preferably 80 parts by mass or more relative to 100 parts by mass of the surface protective layer. The ionizing radiation-curable resin constituting the surface protective layer 5 may be selected from known resins such as various monomers and commercially available oligomers, and examples thereof include (meth)acrylic, silicone, polyester, urethane, amide and epoxy-based resins. The ionizing radiation-curable resin may be either an aqueous resin or a non-aqueous (organic solvent-based) resin.

The main component of the ionizing radiation-curable resin constituting the surface protective layer 5 is a tetrafunctional acrylate resin having a repeating structure. Examples of the tetrafunctional acrylate resin include pentaerythritol tetraacrylate. The main component herein refers to a component contained in an amount of 60 parts by mass or more, more preferably 70 parts by mass or more, and most preferably 80 parts by mass or more relative to 100 parts by mass of the constituent resin component. Tri- or lower functional acrylate resins are not preferred due to insufficient cross-linking and lower scratch resistance. Tetra- or higher functional acrylate resins are not preferred due to excessive cross-linking and lower processability.

When gravure printing is used for coating, the ionizing radiation-curable resin has a suitable viscosity range of 10 mPa·s to 500 mPa·s and an optimal viscosity range of 50 mPa·s to 300 mPa·s. To adjust viscosity, an organic solvent or a bifunctional acrylate resin with a low viscosity can be added. However, from the viewpoint of environmental impact, organic solvent is not preferred. Adding a large amount of bifunctional acrylate resin is not preferred since it reduces the scratch resistance. For this reason, when adding a bifunctional acrylate resin to a tetrafunctional acrylate resin, the bifunctional acrylate resin content is preferably in the range of 10 mass % or greater and 30 mass % or less of the tetrafunctional acrylate resin content (mass), and more preferably in the range of 15 mass % or greater and 20 mass % or less.

Further, the viscosity range of the ionizing radiation-curable resin may be 10 mPa·s to 80 mPa·s, and preferably 10 mPa·s to 50 mPa·s. When the viscosity range of the ionizing radiation-curable resin is within the above ranges, the versatility of the coating method increases.

Further, the viscosity range of the ionizing radiation-curable resin may be 200 mPa·s to 250 mPa·s, and preferably 220 mPa·s to 250 mPa·s. When the viscosity range of the ionizing radiation-curable resin is within the above ranges, fine uneven shape can be easily formed.

The repeating structure is preferably any of an ethylene oxide (EO) structure, a propylene oxide (PO) structure and an F-caprolactone (CL) structure. More preferably, the repeating structure is ethylene oxide or propylene oxide. The ethylene oxide structure, the propylene oxide structure, and the F-caprolactone structure are preferred since the molecules can rotate freely and are highly flexible, and thus the molecules are easily folded when irradiated with light at 200 nm or less, whereby fine uneven shape can be easily formed. The number of repetitions of the repeating structure is 12 or greater. More preferably, the number of repetitions is 12 or greater and 50 or less, and most preferably 20 or greater and 50 or less. When the number of repetitions is 11 or less, the ionizing radiation-curable resin constituting the surface protective layer 5 does not sufficiently shrink during irradiation with vacuum ultraviolet light (VUV light) and the surface protective layer 5 does not have low gloss. When the number of repetitions is greater than 50, cross-linking density decreases, resulting in poor scratch resistance of the surface protective layer 5.

The number of repetitions of the repeating structure can be analyzed using MALDI-TOF-MS. The ionizing radiation-curable resin has a molecular weight distribution in some cases. In the molecular weight distribution of the ionizing radiation-curable resin, the number of repetitions refers to the number of repetitions of the structure corresponding to the molecular weight with the highest peak in a MALDI-TOF-MS mass spectrum.

The ratio between vinyl groups and carbonyl groups contained in the ionizing radiation-curable resin (content ratio: content of vinyl groups/content of carbonyl groups) can be analyzed using Fourier transform infrared spectroscopy. The peak area at around 1,400 cm$^{-1}$ derived from vinyl groups and the peak area at around 1,720 cm$^{-1}$ derived from carbonyl groups are calculated, and the ratio (content ratio) vinyl groups/carbonyl groups can be calculated. The lower the ratio of vinyl groups, the higher the reactivity and the cross-linking density, resulting in increased scratch resistance. Therefore, the ratio vinyl groups/carbonyl groups is preferably 20% or less. The ratio vinyl groups/carbonyl groups is more preferably 10% or less, still more preferably 8% or less, and most preferably 5% or less.

Further, the ratio vinyl groups/carbonyl groups is preferably 0.01% or greater. When the ratio vinyl groups/carbonyl groups is 0.01% or greater, excellent scratch resistance can be imparted. The ionizing radiation-curable resin may not necessarily contain vinyl groups.

The ratio (content ratio) vinyl groups/carbonyl groups herein refers to a "molar ratio".

The ratio vinyl groups/carbonyl groups in the ridged portion 5B may be greater than the ratio vinyl groups/carbonyl groups in the core portion 5A. Specifically, the value of the ratio vinyl groups/carbonyl groups in the ridged portion 5B to the ratio vinyl groups/carbonyl groups in the core portion 5A ((vinyl groups/carbonyl groups) in the ridged portion 5B/(vinyl groups/carbonyl groups) in the core portion 5A) may be 1.1 or greater and 200 or less, and preferably 1.1 or greater and 100 or less. When the value of the ratio vinyl groups/carbonyl groups in the ridged portion 5B to the ratio vinyl groups/carbonyl groups in the core portion 5A is within the above ranges, the surface protective layer 5 (particularly, the ridged portion 5B) can have increased flexibility.

The ratio vinyl groups/carbonyl groups in the ridged portion 5B may be smaller than the ratio vinyl groups/carbonyl groups in the core portion 5A. Specifically, the value of the ratio vinyl groups/carbonyl groups in the ridged portion 5B to the ratio vinyl groups/carbonyl groups in the core portion 5A ((vinyl groups/carbonyl groups) in the ridged portion 5B/(vinyl groups/carbonyl groups) in the core portion 5A) may be 0.01 or greater and 0.99 or less, and preferably 0.05 or greater and 0.99 or less. When the value of the ratio vinyl groups/carbonyl groups in the ridged portion 5B to the ratio vinyl groups/carbonyl groups in the core portion 5A is within the above ranges, the surface protective layer 5 (particularly, the ridged portion 5B) can have increased strength.

It goes without saying that the ratio vinyl groups/carbonyl groups in the ridged portion 5B may be the same as the ratio vinyl groups/carbonyl groups in the core portion 5A.

The surface protective layer 5 may contain particles. Adding an optimal amount of particles having an optimal particle size can form a uniform surface. Examples of the particles that can be used include organic materials such as PE wax, PP wax and resin beads, and inorganic materials such as silica, glass, alumina, titania, zirconia, calcium carbonate and barium sulfate. The particles preferably have an average particle size (D50) of 10 μm or less. The average particle size is more preferably 1 μm or greater and 8 μm or less, still more preferably 2 μm or greater and 6 μm or less, and most preferably 3 μm or greater and 5 μm or less. An average particle size of greater than 10 μm is not preferred since the particles may be detached, resulting in a decrease in scratch resistance. An average particle size of less than 1 μm is not preferred since the particles are less effective in producing a uniform surface.

The amount of particles added is preferably 0.5 parts by mass or more and 10 parts by mass or less, relative to 100 parts by mass of the ionizing radiation-curable resin. The amount of particles added is more preferably 2 parts by mass or more and 8 parts by mass or less, still more preferably 2 parts by mass or more and 6 parts by mass or less, and most preferably 4 parts by mass or more and 5 parts by mass or less. The surface protective layer 5 containing the above-described amount of particles is preferred since a uniform surface condition can be achieved.

The "particle size (average particle size)" herein may be a value (average value) obtained by particle size distribution measurement of the particles used or a value obtained by averaging the particle sizes of a plurality of particles measured by observing a cross-section of the obtained decorative material. Although these values are different in measurement method, the resultant particle sizes are substantially the same. For example, the average particle size of the particles added to the surface protective layer 5 may be a median diameter (D50) measured by a laser diffraction/scattering particle size distribution analyzer.

When the entire surface protective layer 5 is cured with UV light, it is necessary to add a photoinitiator to the surface protective layer 5. The photoinitiator is not particularly limited, and examples thereof include benzophenone-based, acetophenone-based, benzoin ether-based and thioxanthone-based photoinitiators.

To provide the surface protective layer 5 with required functions, functional additives such as an antimicrobial agent and an antifungal agent can be appropriately added. If necessary, an ultraviolet absorbent and a photostabilizer can be added to the surface protective layer 5. The ultraviolet absorbent is typically added in any combination between, for example, benzotriazole-based, benzoate-based, benzophenone-based and triazine-based ultraviolet absorbents, and the photostabilizer is typically added in any combination between, for example, hindered amine-based photostabilizers.

The decorative sheet 1 thus obtained has a gloss level of 15 or less, although it does not contain a matting agent (matting additive). If a conventional decorative sheet having a surface protective layer has a gloss level of 8 or less, the surface protective layer has a high matting agent content, which makes the surface protective layer opaque. This may hinder clear expression of the colors and patterns of the colored pattern layer or deteriorate the design properties of the decorative sheet. Further, in order to produce a decorative sheet having a gloss level close to 0, it is necessary to further increase the matting agent content in the surface protective layer, and thus it is difficult to provide a surface protective layer with a smooth surface without causing streaks, unevenness, or the like.

The decorative sheet 1 can provide a decorative sheet having a gloss level of 15 or less while maintaining substantially the same performance as a decorative sheet having a gloss level of 20 or greater. The "gloss level" herein refers to a measurement determined at an incident angle of 60 degrees with a gloss meter according to JIS Z 8741.

<Concealing Layer 8>

In order to provide the decorative sheet 1 with concealability from the substrate B, a colored sheet may be used as the primary film layer 2, or an opaque concealing layer 8 may be added. Although the concealing layer 8 may be basically formed from the same materials as the pattern layer 3, the pigment preferably used may be, for example, an opaque pigment, titanium oxide or iron oxide for the sake of concealability. Further, in order to increase the concealability, metals such as gold, silver, copper and aluminum may be added. Typically, aluminum flakes are added.

(Production Method)

An example of producing a decorative sheet 1 will now be described.

A resin film is used as a primary film layer 2 and a surface protective layer 5 is printed on the upper surface of the primary film layer 2. A surface protective layer 5 is formed by irradiating a surface of an applied ionizing radiation-curable resin with light having a wavelength of 200 nm or less (first irradiation light) to shrink the surface of the ionizing radiation-curable resin. Then, the shrunk ionizing radiation-curable resin is cured by irradiating it with ionizing radiation or with UV light having a wavelength greater than the first irradiation light, i.e., greater than the light having a wavelength of 200 nm or less. Thus, a decorative sheet 1 is formed that includes the surface protective layer 5 including the core portion 5A and the ridged portion 5B projecting in a ridged pattern from one surface (upper surface) of the core portion 5A.

(Advantageous Effects and Others)

The decorative sheet 1 according to the present embodiment includes the surface protective layer 5 having an uneven shape on the surface. With this configuration, the gloss (gloss level) of the surface protective layer can be adjusted without including a matting agent (matting additive) in the surface protective layer. The matting agent reduces oil repellency of layers formed of resin materials, and thus increases susceptibility to fingerprints. The surface protective layer 5 according to the present embodiment contains no matting agent, and thus has relatively high oil repellency without absorbing oil. Therefore, the decorative sheet 1 including the surface protective layer 5 is resistant to fingerprints in various situations during site operations, furniture assembly, and residents' daily living.

Moreover, according to the configuration of the surface protective layer 5 having an uneven shape on the surface, the oil repellency of the surface protective layer 5 is improved, preventing the surface of the decorative sheet 1 from being oil-stained or adsorbing contaminants.

Furthermore, according to the configuration of the surface protective layer 5 containing no matting agent, scratching the surface of the decorative sheet 1 does not lead to detachment of matting agent particles, reducing occurrence of gloss changes or scratches in the surface of the decorative sheet 1.

In the present embodiment, the surface protective layer 5 is formed of a single layer, but the configuration is not limited thereto. For example, the surface protective layer 5 may have a multilayer configuration. That is, the surface protective layer 5 may be formed of a laminate of a plurality of layers of the same ionizing radiation-curable resins or different ionizing radiation-curable resins in order to form an uneven shape on the surface. When forming a laminate of a plurality of layers of different ionizing radiation-curable resins, for example, the outermost layer of the surface protective layer 5 may contain an ionizing radiation-curable resin as a main material, the ionizing radiation-curable resin may contain, as a main component, a tetrafunctional acrylic resin having a repeating structure, the repeating structure may have any of an ethylene oxide, propylene oxide and F-caprolactone structures, the number of repetitions of the repeating structure may be 12 or more, the content of vinyl groups contained in the ionizing radiation-curable resin may be 20% or less relative to the content of carbonyl groups contained in the ionizing radiation-curable resin, and a layer of the surface protective layer 5 on the primary film layer 2-side (that is, a layer underlying the outermost layer of the surface protective layer 5) may not be particularly limited.

EXAMPLES

Examples according to the present invention will be described below.

Example 1

A 55 μm-thick olefin film (manufactured by RIKEN TECHNOS CORP.) was used as a primary film layer, and one surface of the primary film layer was subjected to a corona treatment, which was in turn coated with a coating solution for the surface protective layer described below. The thickness of the coating solution for the surface protective layer was 5 μm. Then, a surface of the coating solution for the surface protective layer was irradiated with light having a wavelength of 172 nm using a Xe excimer lamp so that the integrated light intensity was 100 mJ/cm$^2$ to thereby shrink the surface. Subsequently, the coating solution for the surface protective layer was cured by irradiating it with 15 kGy of ionizing radiation to form a surface protective layer 5. Thus, a decorative sheet of Example 1 having a total thickness of 60 μm was produced.

(Coating Solution for Surface Protective Layer)

The coating solution for the surface protective layer was prepared by blending the ionizing radiation-curable resin described below with the particles described below.

Ionizing Radiation-Curable Resin
  Type: Ethoxylated pentaerythritol tetraacrylate (35 moles of EO added)
  Product name: NK Ester ATM-35E (manufactured by SHIN-NAKAMURA CHEMICAL Co., Ltd.)
  Content: 100 parts by mass
Particles
  Product name: SYLYSIA 250N (manufactured by Fuji Silysia Chemical Ltd.)
  Particle size: 5 μm
  Content: 0.5 parts by mass Example 2

A decorative sheet of Example 2 was produced in the same manner as in Example 1 except that the ionizing radiation-curable resin in Example 1 was replaced with the following.
Ionizing Radiation-Curable Resin
  Type: Ethoxylated pentaerythritol tetraacrylate (50 moles of EO added)

Example 3

A decorative sheet of Example 3 was produced in the same manner as in Example 1 except that the ionizing radiation-curable resin in Example 1 was replaced with the following.
Ionizing Radiation-Curable Resin
  Type: Ethoxylated pentaerythritol tetraacrylate (20 moles of EO added)

Example 4

A decorative sheet of Example 4 was produced in the same manner as in Example 1 except that the ionizing radiation-curable resin in Example 1 was replaced with the following.
Ionizing Radiation-Curable Resin
  Type: Propoxylated pentaerythritol tetraacrylate (35 moles of PO added)

Example 5

A decorative sheet of Example 5 was produced in the same manner as in Example 1 except that the ionizing radiation-curable resin in Example 1 was replaced with the following.
Ionizing Radiation-Curable Resin
  Type: Caprolactone-modified pentaerythritol tetraacrylate (30 moles of caprolactone (CL) added)

Example 6

A decorative sheet of Example 6 having a total thickness of 56 μm was produced in the same manner as in Example 1 except that the thickness of the coating solution for the surface protective layer in Example 1 was changed to 1 km.

Example 7

A decorative sheet of Example 7 having a total thickness of 57 μm was produced in the same manner as in Example 1 except that the thickness of the coating solution for the surface protective layer in Example 1 was changed to 2 km.

Example 8

A decorative sheet of Example 8 having a total thickness of 75 μm was produced in the same manner as in Example 1 except that the thickness of the coating solution for the surface protective layer in Example 1 was changed to 20 km.

Example 9

A decorative sheet of Example 9 having a total thickness of 80 μm was produced in the same manner as in Example 1 except that the thickness of the coating solution for the surface protective layer in Example 1 was changed to 25 km.

Example 10

A decorative sheet of Example 10 was produced in the same manner as in Example 9 except that the particles in Example 9 were not added.

Example 11

A decorative sheet of Example 11 was produced in the same manner as in Example 3 except that the particles in Example 3 were not added.

Example 12

A decorative sheet of Example 12 was produced in the same manner as in Example 1 except that the particles in Example 1 were replaced with the following.
Particles
  Product name: SYLYSIA 450 (manufactured by Fuji Silysia Chemical Ltd.)
  Particle size: 8.0 μm
  Content: 0.5 parts by mass Example 13

A decorative sheet of Example 13 was produced in the same manner as in Example 1 except that the particles in Example 1 were replaced with the following.
Particles
  Product name: SYLYSIA 780 (manufactured by Fuji Silysia Chemical Ltd.)
  Particle size: 11.3 μm
  Content: 0.5 parts by mass Example 14

A decorative sheet of Example 14 was produced in the same manner as in Example 1 except that the particles in Example 1 were added in an amount of 10 parts by mass.

Example 15

A decorative sheet of Example 15 was produced in the same manner as in Example 1 except that the particles in Example 1 were added in an amount of 11 parts by mass.

Example 16

A decorative sheet of Example 16 having a total thickness of 56 μm was produced in the same manner as in Example 1 except that the thickness of the coating solution for the surface protective layer in Example 1 was changed to 1 μm and the particles were not added.

Example 17

A decorative sheet of Example 17 was produced in the same manner as in Example 1 except that the ionizing radiation-curable resin in Example 1 was replaced with the following.

Ionizing Radiation-Curable Resin
Type: Ethoxylated pentaerythritol tetraacrylate (12 moles of EO added)

Example 18

A decorative sheet of Example 18 having a total thickness of 80 µm was produced in the same manner as in Example 2 except that the thickness of the coating solution for the surface protective layer in Example 2 was changed to 25 km.

Example 19

A decorative sheet of Example 19 was produced in the same manner as in Example 1 except that the amount of ionizing radiation in Example 1 was changed to 30 kGy.

Example 20

A decorative sheet of Example 20 was produced in the same manner as in Example 1 except that the amount of ionizing radiation in Example 1 was changed to 60 kGy.

Comparative Example 1

A decorative sheet of Comparative Example 1 was produced in the same manner as in Example 1 except that the irradiation using an excimer lamp in Example 1 was not performed and the blending amount of the particles was changed to 15 parts by mass.

Comparative Example 2

A decorative sheet of Comparative Example 2 was produced in the same manner as in Example 1 except that the ionizing radiation-curable resin in Example 1 was replaced with the following.
Ionizing Radiation-Curable Resin
Type: Trimethylolpropane EO-modified triacrylate (6 moles of EO added)
Product name: Miramer M3160 (manufactured by Miwon)

Comparative Example 3

A decorative sheet of Comparative Example 3 was produced in the same manner as in Example 1 except that the ionizing radiation-curable resin in Example 1 was replaced with the following.
Ionizing Radiation-Curable Resin
Type: Ethoxylated dipentaerythritol polyacrylate (12 moles of EO added)
Product name: NK Ester A-DPH-12E (manufactured by SHIN-NAKAMURA CHEMICAL Co., Ltd.)

Comparative Example 4

A decorative sheet of Comparative Example 4 was produced in the same manner as in Example 1 except that the ionizing radiation-curable resin in Example 1 was replaced with the following.
Ionizing Radiation-Curable Resin
Type: pentaerythritol tetraacrylate
Product name: NK Ester A-TMMT (manufactured by SHIN-NAKAMURA CHEMICAL Co., Ltd.)

Comparative Example 5

A decorative sheet of Comparative Example 5 was produced in the same manner as in Example 1 except that the amount of ionizing radiation in Example 1 was changed to 5 kGy.

(Evaluations)

The decorative sheets of Examples 1 to 20 and Comparative Examples 1 to 5 produced by the methods described above were assessed.

In the present examples, decorative sheets rated as "good" and "fair" were judged as a pass since there were no problems in actual use.

<Surface Condition>

The surface condition was determined by visual inspection of the surface uniformity.
The evaluation criteria were as follows.
Good: Surface condition is uniform
Fair: Surface condition is partially nonuniform
Poor: Surface condition is entirely nonuniform <Gloss Level>

The gloss level was determined by measuring a 60-degree gloss level using a Rhopoint IQ (manufactured by KONICA MINOLTA, INC.). In Tables 1 to 2, the 60-degree gloss level is expressed as "60° gloss value."

Since a gloss level of 15 or less is perceived as sufficiently low gloss in visual inspection, a gloss level of 15 or less was judged as a pass in the present examples.

<Fourier Transform Infrared Spectroscopy>

Fourier transform infrared spectroscopy was performed using Frontier (manufactured by PerkinElmer Inc.) with a single-reflection (incident angle 45°) ATR unit with a diamond crystal having a sample contact area of 2 mmφ. The measurement conditions were a measurement wavenumber range of 4,000 $cm^{-1}$ to 400 $cm^{-1}$ and a resolution of 2.0 $cm^{-1}$, the interior of the optical system was replaced with a nitrogen atmosphere, and 16 scans were integrated to obtain an absorption spectrum. The obtained spectrum was subjected to ATR correction and the value of a peak area ratio x was calculated using the following formula 1.

$$\text{Peak area ratio } x = \left(\text{peak area at around } 1{,}400\ cm^{-1}\right) / \left(\text{peak area at around } 1{,}725\ cm^{-1}\right) \quad \text{(formula 1)}$$

In formula 1, the peak at around 1,400 $cm^{-1}$ refers to a peak having a maximum absorbance at 1,400±10 $cm^{-1}$, and the peak at around 1,725 $cm^{-1}$ refers to a peak having a maximum absorbance at 1,725±10 $cm^{-1}$.

In the examples and comparative examples, the ratio "vinyl groups/carbonyl groups (%)" was calculated based on the value of the peak area ratio x.

Further, the ratio "vinyl groups/carbonyl groups (%)" in the examples and comparative examples was adjusted by adjusting the amount of ionizing radiation.

<Fingerprint Resistance: Evaluation of Wipe-Off Capability>

Evaluation of fingerprint wipe-off capability was performed for evaluating fingerprint resistance.

The 60-degree gloss level of the surface of each decorative sheet was measured as [initial gloss level]. Then, after a solution for evaluating fingerprint resistance was applied to the surface protective layer, the solution for evaluating fingerprint resistance on the surface of the decorative sheet was wiped off. Subsequently, the 60-degree gloss level of the area from which the solution for evaluating fingerprint resistance had been wiped off was measured as [gloss level after wiping-off]. The solution for evaluating fingerprint resistance used was a higher fatty acid.

The fingerprint wipe-off rate was calculated as follows.

Fingerprint wipe-off rate (%) =
(gloss level after wiping-off / initial gloss level) × 100

The evaluation criteria were as follows.
Good: 70% or more and less than 250%
Fair: 50% or more and less than 70%, or 250% or more and less than 300%
Poor: Less than 50%, or 300% or more <Stain Resistance>
Stain A test specified by Japanese Agricultural Standards (JAS) was performed as stain resistance evaluation, in which 10 mm-wide lines were respectively drawn in blue ink, quick-drying black ink and red crayon, which were then left for 4 hours. Then, the blue ink, quick-drying black ink and red crayon lines were wiped off with a cloth impregnated with ethanol to evaluate the ink stain resistance.

The evaluation criteria were as follows.
Good: All the color lines were easily wiped off.
Fair: The color lines were partially wiped off, but stains were partially left.
Poor: The color lines could not be wiped off.

<Scratch Resistance Test: Steel Wool Rubbing Test>
The obtained decorative sheet was bonded to a wooden substrate B using a urethane-based adhesive, and then subjected to a steel wool rubbing test for evaluating scratch resistance. The surface of the decorative sheet was scrubbed back and forth 20 times with steel wool with a load of 300 g or 400 g, and the surface was visually examined for resultant scratches and changes in gloss.

The evaluation criteria were as follows.
Good: Neither scratches nor change of gloss occurred on the surface
Fair: Slight scratches and/or change of gloss occurred on the surface
Poor: Severe scratches and/or change of gloss occurred on the surface <Scratch Resistance Test: Hoffman Scratch Test>
The obtained decorative sheet was bonded to a wooden substrate B using a urethane-based adhesive, and then subjected to a Hoffman scratch test as a scratch resistance evaluation, using a Hoffman scratch hardness tester (BYK-Gardner GmbH).

The evaluation criteria were as follows.
Very good: No scratch occurred with load of 300 g
Good: No scratch occurred with load of 250 g or more and less than 300 g
Fair: No scratch occurred with load of 200 g or more and less than 250 g
Poor: Scratches occurred with load of less than 200 g In the present examples, decorative sheets rated as "very good," "good" and "fair" were judged as a pass since there were no problems in use.

Figure 6:
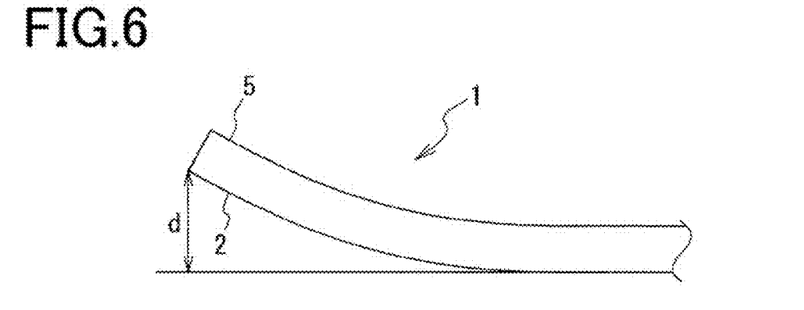
FIG. 6 is a schematic cross-sectional view illustrating a measurement method in a curl test.

<Curl Test>
The obtained decorative sheet was cut into a 10 cm square and allowed to stand for 48 hours under conditions of 25° C. and 50% RH. Then, the average of distances between the four corners of the decorative sheet and a flat surface was calculated. That is, in this curl test, the decorative sheet was placed on a surface (flat surface) of a test table as shown in FIG. 6, and a shortest distance d from the surface to each corner of the decorative sheet was measured, and then these values were averaged to evaluate the curlability of the decorative sheet. This curlability was used as an index of the ease of lamination onto the substrate materials.

The evaluation criteria were as follows.
Good: 3 cm or less
Fair: Greater than 3 cm and 5 cm or less
Poor: Greater than 5 cm <Wrapping Processability Test>
The obtained decorative sheet was subjected to wrapping processing. The bent portion on the surface of the decorative sheet was observed with an optical microscope for whitening or cracking to evaluate the processability. This wrapping processability corresponds to bending processability.

The evaluation criteria were as follows.
Good: Neither whitening nor cracking found
Fair: Whitening found in some parts
Poor: Whitening found on entire surface or cracking found in some parts Tables 1 and 2 show the evaluation results.

TABLE 1

| | | Example 1 | Example 2 | Example 3 | Example 4 | Example 5 |
|---|---|---|---|---|---|---|
| | Surface shape | Ridged | Ridged | Ridged | Ridged | Ridged |
| | Ra (μm) | 1.5 | 1.5 | 1.5 | 1.5 | 1 |
| | RSm (μm) | 180 | 150 | 300 | 180 | 300 |
| | RSm/Ra | 120 | 100 | 200 | 120 | 300 |
| | Thickness (μm) | 5 | 5 | 5 | 5 | 5 |
| Acrylic resin | Number of functional groups | 4 | 4 | 4 | 4 | 4 |
| | Repeating structure  Structure | C2H4O | C2H4O | C2H4O | C3H6O | C6H10O2 |
| | Repeating structure  Number of repetitions | 35 | 50 | 20 | 35 | 30 |
| | Vinyl groups/carbonyl groups (%) | 20% | 20% | 20% | 20% | 20% |
| Additive | Particle size (μm) | 5 | 5 | 5 | 5 | 5 |
| | Addition amount (part) | 0.5 | 0.5 | 0.5 | 0.5 | 0.5 |
| | Surface condition | Good | Good | Good | Good | Good |
| | 60° Gloss level | 3 | 2 | 5 | 3 | 10 |
| | Fingerprint resistance | Good | Good | Good | Good | Good |
| | Stain resistance    Stain A | Good | Good | Good | Good | Good |

TABLE 1-continued

|  |  | | | | | |
|---|---|---|---|---|---|---|
| Scratch resistance | Steel 300 g | Good | Good | Good | Good | Good |
|  | Steel 400 g | Good | Good | Good | Good | Good |
|  | Hoffman scratch | Fair | Fair | Good | Fair | Good |
| Processability | Curl | Good | Good | Good | Good | Good |
|  | Wrapping | Good | Good | Good | Good | Good |

| | | Example 6 | Example 7 | Example 8 | Example 9 | Example 10 |
|---|---|---|---|---|---|---|
| | Surface shape | Ridged | Ridged | Ridged | Ridged | Ridged |
| | Ra (μm) | 0.3 | 0.6 | 4.5 | 8 | 8 |
| | RSm (μm) | 90 | 120 | 360 | 400 | 400 |
| | RSm/Ra | 300 | 200 | 80 | 50 | 50 |
| | Thickness (μm) | 1 | 2 | 20 | 25 | 25 |
| Acrylic resin | Number of functional groups | 4 | 4 | 4 | 4 | 4 |
| | Repeating structure Structure | C2H4O | C2H4O | C2H4O | C2H4O | C2H4O |
| | Number of repetitions | 35 | 35 | 35 | 35 | 35 |
| | Vinyl groups/carbonyl groups (%) | 20% | 20% | 20% | 20% | 20% |
| Additive | Particle size (μm) | 5 | 5 | 5 | 5 | None |
| | Addition amount (part) | 0.5 | 0.5 | 0.5 | 0.5 | — |
| | Surface condition | Fair | Good | Good | Good | Fair |
| | 60° Gloss level | 8 | 5 | 2 | 1.5 | 3 |
| | Fingerprint resistance | Good | Good | Good | Good | Good |
| Stain resistance | Stain A | Good | Good | Good | Good | Good |
| Scratch resistance | Steel 300 g | Fair | Good | Good | Good | Good |
| | Steel 400 g | Fair | Good | Good | Good | Good |
| | Hoffman scratch | Fair | Fair | Fair | Fair | Fair |
| Processability | Curl | Good | Good | Good | Good | Good |
| | Wrapping | Good | Good | Good | Fair | Fair |

| | | Example 11 | Example 12 | Example 13 | Example 14 | Example 15 |
|---|---|---|---|---|---|---|
| | Surface shape | Ridged | Ridged | Ridged | Ridged | Ridged |
| | Ra (μm) | 1 | 1.5 | 1.5 | 1.5 | 1.5 |
| | RSm (μm) | 250 | 180 | 180 | 210 | 180 |
| | RSm/Ra | 250 | 120 | 120 | 140 | 120 |
| | Thickness (μm) | 5 | 5 | 5 | 5 | 5 |
| Acrylic resin | Number of functional groups | 4 | 4 | 4 | 4 | 4 |
| | Repeating structure Structure | C2H4O | C2H4O | C2H4O | C2H4O | C2H4O |
| | Number of repetitions | 20 | 35 | 35 | 35 | 35 |
| | Vinyl groups/carbonyl groups (%) | 20% | 20% | 20% | 20% | 20% |
| Additive | Particle size (μm) | None | 8 | 11 | 5 | 5 |
| | Addition amount (part) | — | 0.5 | 0.5 | 10 | 11 |
| | Surface condition | Fair | Good | Good | Good | Good |
| | 60° Gloss level | 7 | 3 | 3 | 3 | 3 |
| | Fingerprint resistance | Good | Good | Fair | Good | Fair |
| Stain resistance | Stain A | Good | Good | Fair | Good | Fair |
| Scratch resistance | Steel 300 g | Good | Good | Fair | Good | Fair |
| | Steel 400 g | Good | Good | Fair | Good | Fair |
| | Hoffman scratch | Good | Fair | Fair | Fair | Fair |
| Processability | Curl | Good | Good | Good | Good | Good |
| | Wrapping | Good | Good | Fair | Good | Fair |

| | | Example 16 | Example 17 | Example 18 | Example 19 | Example 20 |
|---|---|---|---|---|---|---|
| | Surface shape | Ridged | Ridged | Ridged | Ridged | Ridged |
| | Ra (μm) | 0.4 | 1.2 | 5 | 1.5 | 1.5 |
| | RSm (μm) | 120 | 360 | 50 | 180 | 180 |
| | RSm/Ra | 300 | 300 | 10 | 120 | 120 |
| | Thickness (μm) | 1 | 5 | 25 | 5 | 5 |
| Acrylic resin | Number of functional groups | 4 | 4 | 4 | 4 | 4 |
| | Repeating structure Structure | C2H4O | C2H4O | C2H4O | C2H4O | C2H4O |
| | Number of repetitions | 35 | 12 | 50 | 35 | 35 |
| | Vinyl groups/carbonyl groups (%) | 20% | 20% | 20% | 10% | 0.01% |
| Additive | Particle size (μm) | None | 5 | 5 | 5 | 5 |
| | Addition amount (part) | — | 0.5 | 0.5 | 0.5 | 0.5 |

TABLE 1-continued

|   |   |   |   |   |   |   |
|---|---|---|---|---|---|---|
| Surface condition | | Fair | Good | Good | Good | Good |
| 60° Gloss level | | 10 | 10 | 1 | 3 | 3 |
| Fingerprint resistance | | Good | Good | Good | Good | Good |
| Stain resistance | Stain A | Good | Good | Good | Good | Good |
| Scratch resistance | Steel 300 g | Fair | Good | Good | Good | Good |
| | Steel 400 g | Fair | Good | Good | Good | Good |
| | Hoffman scratch | Fair | Good | Fair | Very Good | Very Good |
| Processability | Curl | Good | Good | Good | Good | Good |
| | Wrapping | Good | Good | Fair | Good | Good |

TABLE 2

|   |   | Comparative Example 1 | Comparative Example 2 | Comparative Example 3 | Comparative Example 4 | Comparative Example 5 |
|---|---|---|---|---|---|---|
| | Surface shape | Asperities due to particles | Ridged | Ridged | Ridged | Ridged |
| | Ra (μm) | 0.8 | 1.5 | 1.2 | 0.5 | 1.5 |
| | RSm (μm) | 320 | 150 | 360 | 2,000 | 180 |
| | RSm/Ra | 400 | 100 | 300 | 4,000 | 230 |
| | Thickness (μm) | 5 | 5 | 5 | 5 | 5 |
| Acrylic resin | Number of functional groups | 4 | 3 | 6 | 4 | 4 |
| Repeating structure | Structure | C2H4O | C2H4O | C2H4O | None | C2H4O |
| | Number of repetitions | 35 | 6 | 12 | 0 | 35 |
| | Vinyl groups/carbonyl groups (%) | 20% | 20% | 20% | 20% | 30% |
| Additive | Particle size (μm) | 5 | 5 | 5 | 5 | 5 |
| | Addition amount (part) | 15 | 0.5 | 0.5 | 0.5 | 0.5 |
| | Surface condition | Good | Good | Good | Good | Good |
| | 60° Gloss level | 10 | 3 | 8 | 90 | 3 |
| | Fingerprint resistance | Poor | Good | Good | Poor | Fair |
| Stain resistance | Stain A | Poor | Good | Good | Good | Fair |
| Scratch resistance | Steel 300 g | Poor | Poor | Good | Good | Fair |
| | Steel 400 g | Poor | Poor | Good | Good | Poor |
| | Hoffman scratch | Poor | Fair | Good | Good | Poor |
| Processability | Curl | Good | Good | Poor | Good | Good |
| | Wrapping | Good | Good | Poor | Good | Good |

As shown in Table 1, the decorative sheets of Examples 1 to 20 can provide decorative sheets having a gloss level of 15 or less and achieving fingerprint resistance, scratch resistance, stain resistance and bending processability. The performance can be further improved by optimizing not only the surface shape of the surface protective layer and the resin composition of the surface protective layer, but also the thickness of the surface protective layer and the particle size and the amount of particles contained.

REFERENCE SIGNS LIST

1 Decorative sheet; 2 Primary film layer; 3 Pattern layer; 4 Transparent resin layer; 5 Surface protective layer; 6 Primer layer; 7 Adhesive layer; 8 Concealing layer; 11 Decorative material; B Substrate.

What is claimed is:

1. A decorative sheet, comprising:
a primary film layer; and
a surface protective layer disposed on one surface of the primary film layer, wherein
the surface protective layer has a gloss level of 15 or less,
the surface protective layer includes a ridged portion projecting in a ridged pattern from a surface of the surface protective layer to form an uneven shape on the surface,
the surface protective layer contains an ionizing radiation-curable resin as a main material,
the ionizing radiation-curable resin contains, as a main component, a tetrafunctional acrylic resin having a repeating structure,
the number of repetitions of the repeating structure is 12 or more,
a content of vinyl groups contained in the ionizing radiation-curable resin is 20% or less relative to carbonyl groups contained in the ionizing radiation-curable resin, and
the uneven shape of the surface protective layer has RSm/Ra in a range of 10 or greater and 300 or less.

2. The decorative sheet of claim 1, wherein
the repeating structure is any of ethylene oxide, propylene oxide and F-caprolactone structures.

3. The decorative sheet of claim 1, wherein
the surface protective layer has a thickness in a range of 2 μm or greater and 20 μm or less.

4. The decorative sheet of claim 1, wherein
the surface protective layer contains particles having an average particle size of 10 μm or less.

5. The decorative sheet of claim 4, wherein
the particles are added in an amount in a range of 0.5 parts by mass or more and 10 parts by mass or less relative to 100 parts by mass of the ionizing radiation-curable resin.

6. The decorative sheet of claim 1, wherein
the surface protective layer includes a core portion and the ridged portion provided on the core portion, and
a ratio of a thickness of the ridged portion to a thickness of the core portion (thickness of ridged portion/thickness of core portion) is in a range of 0.01 or greater and 2.0 or less.

7. The decorative sheet of claim 1, wherein
the surface protective layer includes a core portion and the ridged portion provided on the core portion, and
a ratio of a thickness of the ridged portion to a thickness of the core portion (thickness of ridged portion/thickness of core portion) is in a range of 0.1 or greater and 1.0 or less.

8. The decorative sheet of claim 1,
wherein the uneven shape of the surface protective layer has RSm/Ra in a range of 50 or greater and 300 or less.

9. The decorative sheet of claim 1,
wherein the uneven shape of the surface protective layer has RSm/Ra in a range of 100 or greater and 300 or less.

10. The decorative sheet of claim 1, wherein
the uneven shape of the surface protective layer has RSm/Ra in a range of 80 or greater and 150 or less.

11. The decorative sheet of claim 1, wherein
the ridged portion has a sinusoidal cross-sectional shape in a thickness direction of the surface protective layer.

12. The decorative sheet of claim 1, wherein
the tetrafunctional acrylate resin is a resin composed of pentaerythritol tetraacrylate.

13. A method of producing the decorative sheet of claim 1, comprising the steps of:
irradiating a surface of an applied ionizing radiation-curable resin with light having a wavelength of 200 nm or less, and
then irradiating with ionizing radiation or with UV light having a wavelength greater than the light having a wavelength of 200 nm or less to form the surface protective layer having a ridged portion projecting in a ridged pattern.

14. The method of producing a decorative sheet of claim 13, wherein
the light having a wavelength of 200 nm or less is light having a wavelength of 172 nm.

15. The method of producing a decorative sheet of claim 13, comprising the steps of:
irradiating a surface of an applied ionizing radiation-curable resin with light having a wavelength of 200 nm or less, and
then irradiating with ionizing radiation or with UV light having a wavelength greater than the light having a wavelength of 200 nm or less only once to form a surface protective layer having a ridged portion projecting in a ridged pattern, wherein
the light having a wavelength of 200 nm or less has an integrated light intensity in a range of 0.5 mJ/cm$^2$ or greater and 200 mJ/cm$^2$ or less.

16. The method of producing a decorative sheet of claim 13, wherein
the UV light having a wavelength greater than the light having a wavelength of 200 nm or less has an integrated light intensity in a range of 10 mJ/cm$^2$ or greater and 500 mJ/cm$^2$ or less.

17. The method of producing a decorative sheet of claim 13, comprising the steps of:
irradiating a surface of an applied ionizing radiation-curable resin with light having a wavelength of 200 nm or less, and
then irradiating with ionizing radiation to form the surface protective layer having a ridged portion projecting in a ridged pattern.

18. The method of producing a decorative sheet of claim 13, wherein
the ionizing radiation-curable resin applied has a viscosity range of 10 mPa·s or greater and 500 mPa·s or less.

* * * * *